(12) United States Patent
Mauroza

(10) Patent No.: US 10,040,010 B1
(45) Date of Patent: Aug. 7, 2018

(54) OIL FILTER CONTENT RETENTION DEVICE

(71) Applicant: Victor Mauroza, Kansas City, MO (US)

(72) Inventor: Victor Mauroza, Kansas City, MO (US)

( * ) Notice: Subject to any disclaimer, the term of this patent is extended or adjusted under 35 U.S.C. 154(b) by 0 days.

(21) Appl. No.: 15/680,825

(22) Filed: Aug. 18, 2017

(51) Int. Cl.
*B01D 35/00* (2006.01)
*B01D 35/30* (2006.01)
*F01M 11/03* (2006.01)

(52) U.S. Cl.
CPC ......... *B01D 35/306* (2013.01); *B01D 35/005* (2013.01); *F01M 11/03* (2013.01); *B01D 2201/301* (2013.01); *F01M 2011/031* (2013.01)

(58) Field of Classification Search
CPC .............. B01D 35/306; B01D 35/005; B01D 2201/301; B01D 35/30; F01M 11/03; F01M 2011/031
See application file for complete search history.

(56) References Cited

U.S. PATENT DOCUMENTS

| | | | |
|---|---|---|---|
| 3,392,873 A | 7/1968 | Old, Jr. | |
| 3,421,653 A | 1/1969 | Whaley | |
| 4,865,727 A * | 9/1989 | Krauss | B01D 35/30 210/167.02 |
| 4,865,731 A * | 9/1989 | Setzer, Sr. | B01D 35/00 210/232 |
| 4,872,586 A | 10/1989 | Landis | |
| 5,498,333 A * | 3/1996 | Canther | B01F 1/0027 210/167.11 |
| 6,080,310 A * | 6/2000 | Bolser | B01D 27/08 210/238 |
| 6,257,417 B1 | 7/2001 | Szumera | |
| 6,971,534 B1 | 12/2005 | Helms | |
| 7,241,385 B1 * | 7/2007 | Cline | B01D 35/30 210/232 |
| 8,182,683 B1 * | 5/2012 | Allen | C02F 1/003 210/244 |
| 2005/0082304 A1 | 4/2005 | Bezek et al. | |
| 2008/0116202 A1 | 5/2008 | Auer et al. | |
| 2009/0090720 A1 | 4/2009 | Minerva | |

* cited by examiner

*Primary Examiner* — Thomas M Lithgow
(74) *Attorney, Agent, or Firm* — Cramer Patent & Design, PLLC; Aaron R. Cramer

(57) ABSTRACT

An oil filter retention device comprises a cup and a lid. The cup has an enlarged upper outer rim having an interior threaded portion. The interior wall of the cup also has a plurality of grip enhancing nubs. The lid is fashioned as a curvilinear upper portion and a frustoconical lower portion. A threaded portion circumscribes an exterior side wall the lid at a position between the upper portion and lower portion. The bottom of the lid is open ended. The lid is configured to removably secure to the cup.

7 Claims, 4 Drawing Sheets

OIL FILTER CONTENT RETENTION DEVICE

FIELD OF THE INVENTION

The present invention relates generally to the field of oil filter content retention devices.

BACKGROUND OF THE INVENTION

Modern internal combustion engines are a true engineering marvel. Their long-run time between major maintenance is in stark contrast to engines of even a few decades ago which required constant adjustment and maintenance to keep them operational. While tune-ups and major repair of such modern marvels are rare, they still do require frequent regular and periodic maintenance with perhaps the most important of these being regular oil changes.

While this task is simple and requires little effort, it often becomes a nuisance due to the mess, spills, and drips that occurred during the oil change process. Much of this mess occurs when removing the oil filter due to the fact that it is usually filled with oil and positioned in a manner such that spillage upon its removal is inevitable. Accordingly, a need has arisen for a means by which oil filters can be easily replaced without the mess and fuss as described above. The development of the oil filter content retention device fulfills this need.

SUMMARY OF THE INVENTION

The inventor has recognized the aforementioned inherent problems and lack in the art and observed that there is a need for an oil filter content retention device.

It is therefore an object of the invention to provide a filter retention device comprising a body which has an interior wall, an exterior wall and an opening, a retention collar which is secured about a top side edge of the opening and a lid which has a lid upper and lower portion. The lid is capable of being secured within the retention collar while the body is capable of removably securing an automobile oil filter. In a separate embodiment, the lid comprises a lid cavity having an opening at the lid lower portion.

The interior wall may comprise an interior gripping surface which may comprise a plurality of inwardly protruding dimples. The exterior wall may comprise an exterior gripping surface which may be texturized. The lid lower portion may comprise a recessed surface. The retention collar may comprise female threading which is disposed about an interior wall while the recessed surface may comprise male threading which is disposed about a recessed surface exterior wall.

The lid may also comprise a central ridge which is circumferentially disposed about and between the lid upper portion and the lid lower portion. The lid may also have an aperture.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
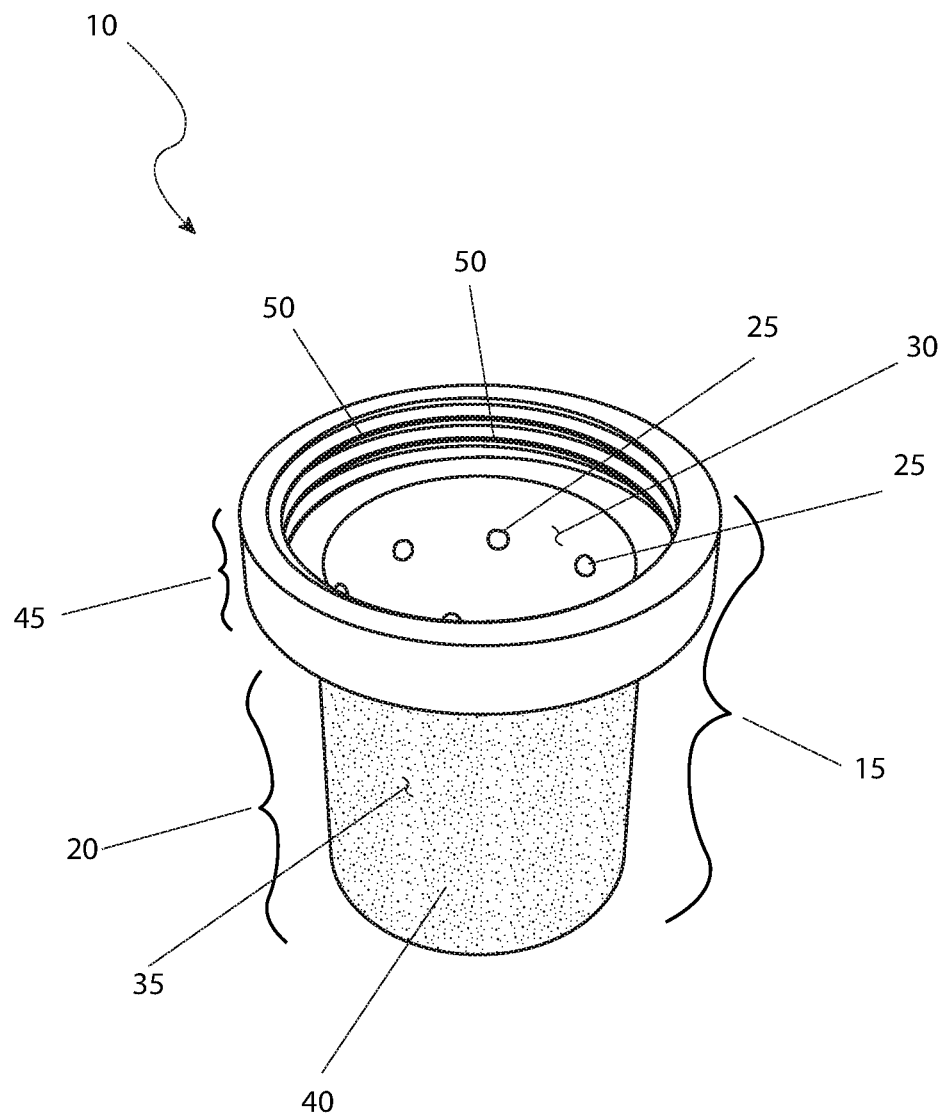
FIG. 1 is a perspective view of the oil filter content retention device 10, according to the preferred embodiment of the present invention.

10 oil filter content retention device
15 cup body
20 bottom portion
25 protruding dimples
30 interior cup body surface
35 exterior cup body surface
40 gripping aid
45 retention collar
50 first engagement threads
55 oil filter
60 travel direction "u" 60
65 travel direction "$r_1$"
70 lid
75 cap portion
80 central ridge
85 hanging hook opening
90 recessed surface
95 second engagement threads
97 lid interior void
100 travel direction "$r_2$"
105 internal combustion engine
110 upper edge of cup body
115 lower edge of engine

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

Referring now to FIG. 1, a perspective view of the oil filter content retention device 10, according to the preferred embodiment of the present invention is disclosed. The oil filter content retention device 10 (herein described as the "device") 10, includes a cup body 15 that completely slides over a standard oil filter used on an internal combustion engine or similar device. The device 10 is designed to reduce mess and spills during the oil filter removal process. It is envisioned that the cup body 15 would be made entirely of semi-rigid material such as rubber or silicone. The cup body 15 would be made in multiple sizes to fit all sizes of screw-on oil filters. A bottom portion 20 holds the actual oil filter and is provided with a series of protruding dimples 25. These protruding dimples 25 provide two (2) functions. First, they form a surface of increased friction, thus gripping the oil filter more firmly to aid in the turning and removal process. Secondly, the provide an increased interstitial space between an interior cup body surface 30 and the side of the contained oil filter, thus providing a storage space for any released or spilled oil that may be present during the removal process.

An exterior cup body surface 35 is provided with a gripping aid 40 such as may be found in texturized coatings imparting a rough surface having crystalline silica, sand, or similar particulate matter embedded in the exterior cup body surface 35 or embedded in durable paint applied to the exterior of the cup body surface 35, to aid in gripping the device 10 and the contained oil filter and turning it to remove it. Such a gripping aid 40 is viewed as beneficial when the user's hands may be coated in oil and otherwise slippery. The upper end of the device 10 is provided with a retention collar 45 which extends for a total height of approximately three-quarters of an inch (¾ in.) above the top of the bottom portion 20. It also is offset from the exterior cup body surface 35 approximately three-quarters of an inch (¾ in.) as well. This offset area provides two (2) functions. First, it covers, shields, and protects the junction point between the oil filter and oil filter housing on the internal combustion engine. Thus, as the bond is broken during the removal process, any oil that is expelled under pressure (albeit low pressure) is captured by the retention collar 45 and thus the device 10. Secondly, the retention collar 45 provides an additional storage area for the body of oil that leaks out during the oil filter change process and is thus captured and properly disposed of. Finally, the retention collar 45 provides for a series of first engagement threads 50 which work in conjunction with a lid which will be described in greater detail herein below.

Figure 2:
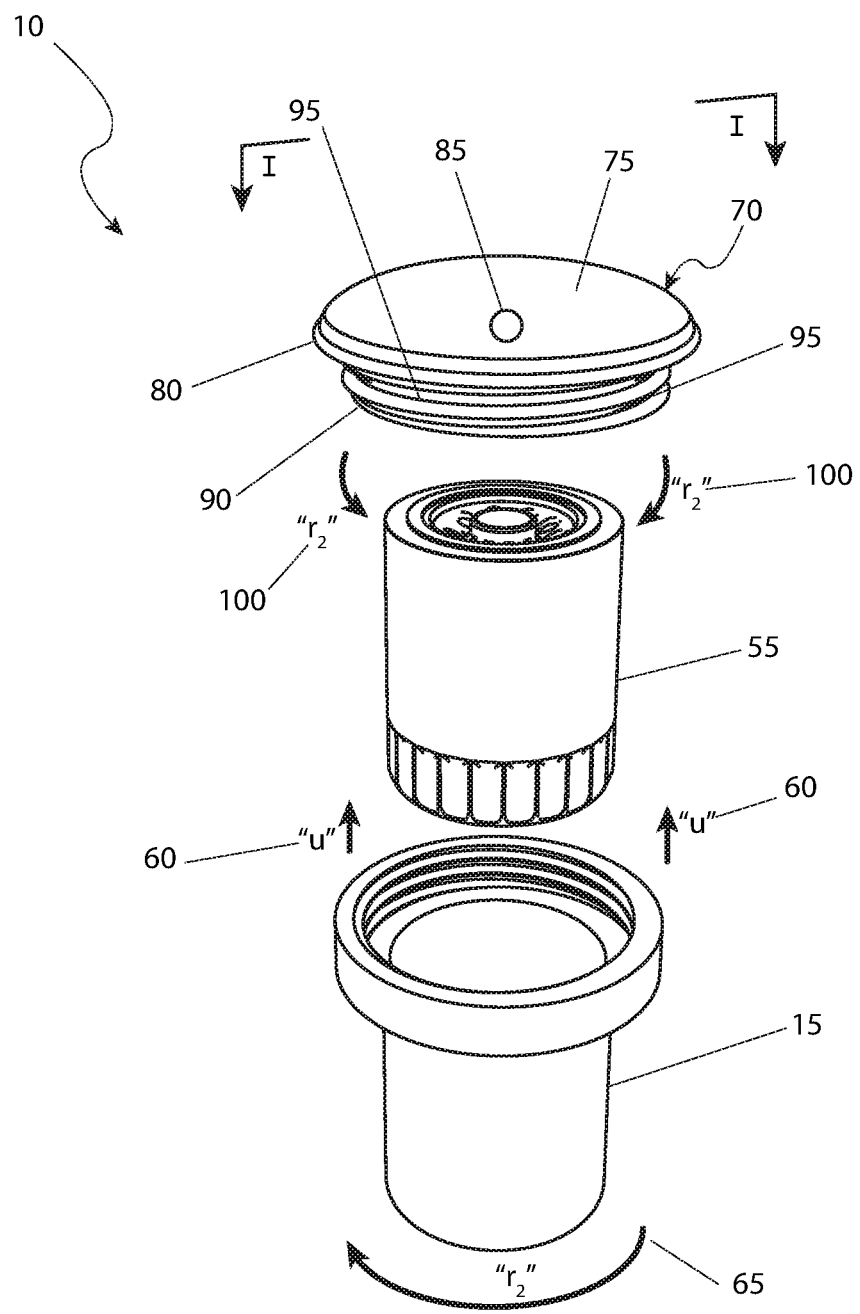
FIG. 2 is an exploded perspective view of the oil filter content retention device 10, according to the preferred embodiment of the present invention.
Figure 4:
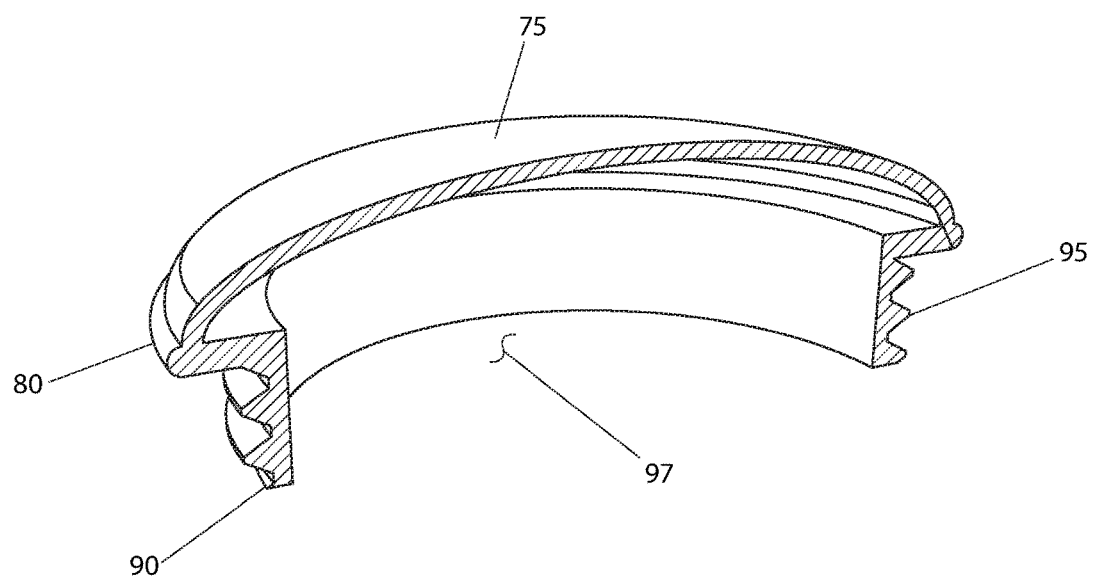

Referring next to FIG. 2, an exploded perspective view of the device 10, according to the preferred embodiment of the present invention is depicted. This figure more clearly depicts the ability of the device 10 to completely engage and encompass an oil filter 55. The oil filter 55 is captured by the placement of the cup body 15 in an upward motion as indicated by travel direction "u" 60. The cup body 15, along with the oil filter 55 is then disengaged from the internal combustion engine by turning the cup body 15 along a travel direction "$r_1$" 65 (counterclockwise). Whereupon the oil filter 55 disengages from the internal combustion engine, a lid 70 may be placed upon the cup body 15 to aid in retention of the oil filter 55 as well as any released oil to aid in temporary storage and transportation of the device 10 to an appropriate used oil disposal location. The lid 70 is provided with a continuous cap portion 75 and a central ridge 80. The central ridge 80 provides a distinct gripping surface to aid in the placement and removal of the lid 70 from the cup body 15 especially with oily and/or slippery hands. The lid 70 is also provided with a hanging hook opening 85 to aid in storage of the device 10 when not in use. The lid 70 is also provided with a recessed surface 90 which is placed on the interior of the retention collar 45 (as shown in FIG. 1) and in a separate embodiment, an interior void 97 to accommodate differently shaped oil filters 55 (as shown in FIG. 4). Likewise, the recessed surface 90 is provided with a series of second engagement threads 95 which engage the first engagement threads 50 (as shown in FIG. 1) to aid in retention and containment. The lid 70 is engaged upon the cup body 15 by motion along a travel direction "$r_2$" 100. Motion in a clockwise direction is envisioned to engage the lid 70 upon the cup body 15, while counterclockwise direction is envisioned to disengage the lid 70 from the cup body 15.

Figure 3:
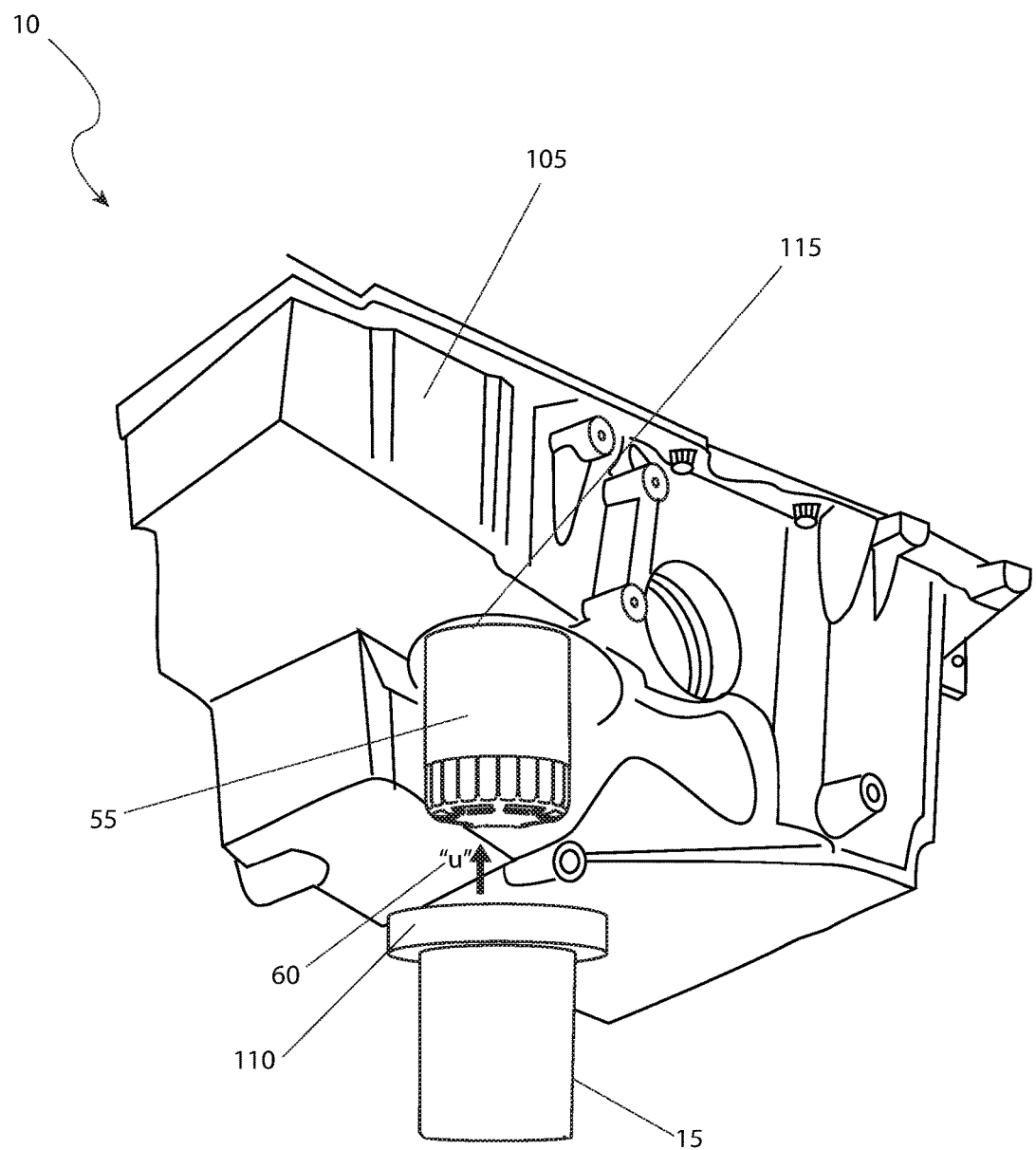
FIG. 3 is a perspective view of the oil filter content retention device 10, shown in a utilized state upon an internal combustion engine 105, according to the preferred embodiment of the present invention; and, FIG. 4 is a cross section view of a lid 70 taken along line I-I in FIG. 2, of the oil filter content retention device 10, according to a separate embodiment of the present invention.

Referring finally now to FIG. 3, a perspective view of the device 10, shown in a utilized state upon an internal combustion engine 105, according to the preferred embodiment of the present invention is shown. As aforementioned described, the cup body 15 is advanced upon the oil filter 55 which has been previously loosened by an oil filter wrench or similar tool. The cup body 15 follows the travel direction "u" 60 until the oil filter 55 is completely covered by the device 10 and an upper edge of cup body 110 contacts a lower edge of engine 115 of the internal combustion engine 105. Upon separation of the oil filter 55 from the internal combustion engine 105, the user would hold the device 10 in place to capture any remaining drips of used oil into the cup body 15.

The preferred embodiment of the present invention can be utilized by the common user in a simple and effortless manner with little or no training. It is envisioned that the device 10 would be constructed in general accordance with FIG. 1 through FIG. 4 using well-known injection molding process. As aforementioned described, the device 10 would be manufactured in multiple sizes to fit all standard sizes of oil filter 55.

To utilize the device 10, the following procedure would be followed; the internal combustion engine 105 would be prepped for an oil and filter change following existing well-known procedures; existing oil would be removed, drained and captured following normal procedures; an oil filter wrench or similar tool would be used to initially loosen the oil filter 55; the cup body 15 would be slid completely over the oil filter 55 using travel direction "u" 60; the user would rotate the device 10 as well as the contained oil filter 55 following the travel direction "$r_1$" 65; upon separation from the internal combustion engine 105, the cup body 15 is held in place to capture any remaining drips of used oil (not shown) within the retention collar 45 of the cup body 15; the cup body 15 is then removed from the presence of the internal combustion engine 105 and the lid 70 installed upon the cup body 15 following the travel direction "$r_2$" 100. At this point in time, the device 10 can be transported safely to the used oil disposal means (not shown) without worry of accidental spillage.

Upon arrival at the used oil disposal means location (not shown), the user would remove the lid 70 and carefully pour all used oil into the used oil disposal means. The oil filter 55 may then be carefully removed and discarded. The cup body 15 and the lid 70 can then be cleaned using normal cleaning procedures used to clean tools, hands, and other objects or surfaces that have contaminated by the oil and oil filter change process. The lid 70 can then be replaced upon the empty cup body 15 and stored by the hanging hook opening 85 until needed again thus allowing for re-use in a continual manner.

It is envisioned that the device 10 is suitable for use on all types of engines including those found on motor vehicles, marine craft, generators, construction tools, and the like. Additionally, said use of the oil filter content retention device 10 is viewed as particularly useful where the oil filter 55 is mounted in a partially horizontal position where used oil is almost certain to leak out upon the internal combustion engine 105. The use of the device 10 eliminates undesired cleanup of the used oil.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A filter retention device, comprising:
    a body comprising:
        an interior wall;
        an exterior wall; and,
        an opening;
    a retention collar secured about a top side edge of said opening; and,
    a lid comprising a lid upper portion and a lid lower portion;
    wherein said lid is capable of being secured within said retention collar; and,
    wherein said body is capable of removably securing an automobile oil filter therein
    wherein an interior gripping surface of said interior wall comprises a plurality of inwardly protruding dimple;
    wherein said retention collar comprises female threading disposed about an interior wall;
    wherein said lid lower portion comprises a recessed surface;
    wherein said recessed surface comprises male threading disposed about a recessed surface exterior wall; and,
    wherein said lid upper portion comprises an aperture.

2. The device of claim 1, wherein said exterior wall comprises an exterior gripping surface.

3. The device of claim 2, wherein said exterior gripping surface comprises a texturized surface.

4. The device of claim 1, wherein said lid further comprises a central ridge circumferentially disposed thereabout and between said lid upper portion and said lid lower portion.

5. A filter retention device, comprising:
    a body comprising:
        an interior wall;
        an exterior wall; and,
        an opening;
    a retention collar secured about a top side edge of said opening; and,
    a lid comprising a lid upper portion, a lid lower portion and a lid cavity having an opening at said lid lower portion;
    wherein said lid is capable of being secured within said retention collar;
    wherein said body is capable of removably securing an automobile oil filter therein;
    wherein an interior gripping surface of said interior wall comprises a plurality of inwardly protruding dimple;
    wherein said retention collar comprises female threading disposed about an interior wall;
    wherein said lid lower portion comprises a recessed surface;
    wherein said recessed surface comprises male threading disposed about a recessed surface exterior wall; and,
    wherein said lid upper portion comprises an aperture.

6. The device of claim 5, wherein said exterior wall comprises an exterior gripping surface.

7. The device of claim 5, wherein said lid further comprises a central ridge circumferentially disposed thereabout and between said lid upper portion and said lid lower portion.

* * * * *